Figure 1:
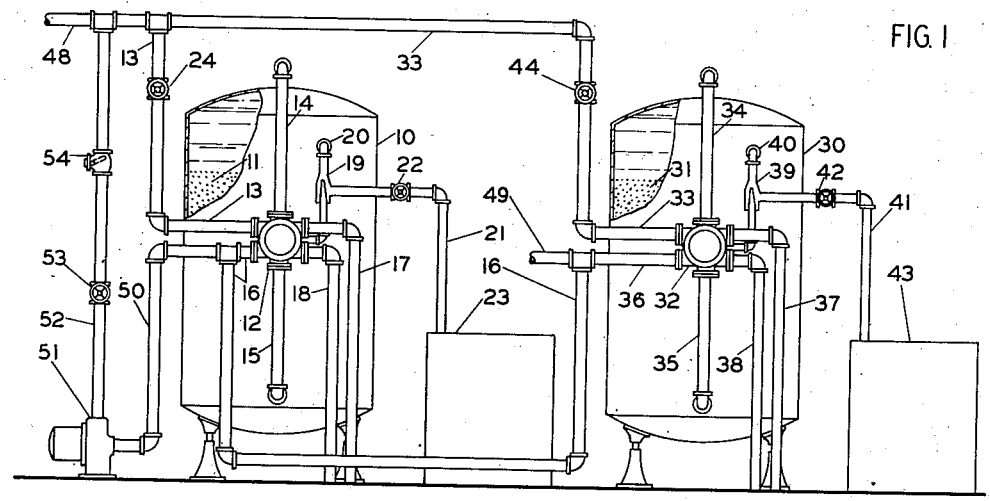

Dec. 31, 1940.  R. RILEY  2,226,743

METHOD OF AND APPARATUS FOR TREATING WATER

Filed Dec. 16, 1939

INVENTOR:
RAY RILEY
BY
ATTORNEY

Patented Dec. 31, 1940

2,226,743

UNITED STATES PATENT OFFICE 2,226,743

METHOD OF AND APPARATUS FOR TREATING WATER

Ray Riley, Birmingham, N. J., assignor to The Permutit Company, New York, N. Y., a corporation of Delaware Application December 16, 1939, Serial No. 309,523

8 Claims. (Cl. 210—24)

This invention relates to method of and apparatus for treating water; and it comprises passing a flow of water to be treated through hydrogen zeolite, then dividing the flow into two streams and mixing one of said streams with the flow of water to be treated prior to passing said flow through hydrogen zeolite; all as more fully set forth hereinafter and as claimed.

Zeolites of all kinds are subject to aggressive attack by prolonged contact with water having phenolphthalein alkalinity. This is true for zeolites of the gel type and of the processed green sand type. It is also true for zeolites of the more recent carbonaceous type which are resistant to acid and may be regenerated with acid to function as hydrogen ion exchange materials. Waters containing appreciable amounts of phenolphthalein alkalinity rarely occur in nature. Many municipal water supplies, however, are given phenolphthalein alkalinity by feeding to them alkali such as hydrate of lime in order to protect the pipe distribution system against corrosive attack. When such water or a natural water with phenolphthalein alkalinity is passed through zeolite for ion exchange the useful life of the zeolite is shortened. Moreover, when a water having phenolphthalein alkalinity is passed through a bed of zeolite of the carbonaceous or greensand type the color of the water frequently increases noticeably due to a pickup of color from the zeolite. In some industries, such as textile or rayon industries, a water free of color is a necessity, and in many uses, such as for household purposes, colored water is highly undesirable.

The phenolphthalein alkalinity of a water supply may be neutralized by feeding an acid, such as sulfuric acid, in appropriate proportional amounts but this involves a continuing operating expense for the purchase of acid, it requires equipment for accurately feeding the acid, and it also increases the total solids content of the water. Another method of reducing phenolphthalein alkalinity is to carbonate the water by blowing $CO_2$ through it to combine with carbonate and form bicarbonate which is harmless to zeolites. This method, however, also necessitates relatively complicated equipment which is high in initial cost as well as upkeep and requires careful and frequent attention in order to maintain uniform results.

The objects of this invention are first, to neutralize phenolphthalein alkalinity of a water supply prior to passage through zeolite without increasing the negative ion or total solids content; secondly, to accomplish this neutralization with equipment of utmost simplicity which is inexpensive in first cost as well as in operation and which requires little attention.

The manner in which these objects are achieved is illustrated in the appended drawing in which—

Figure 2:
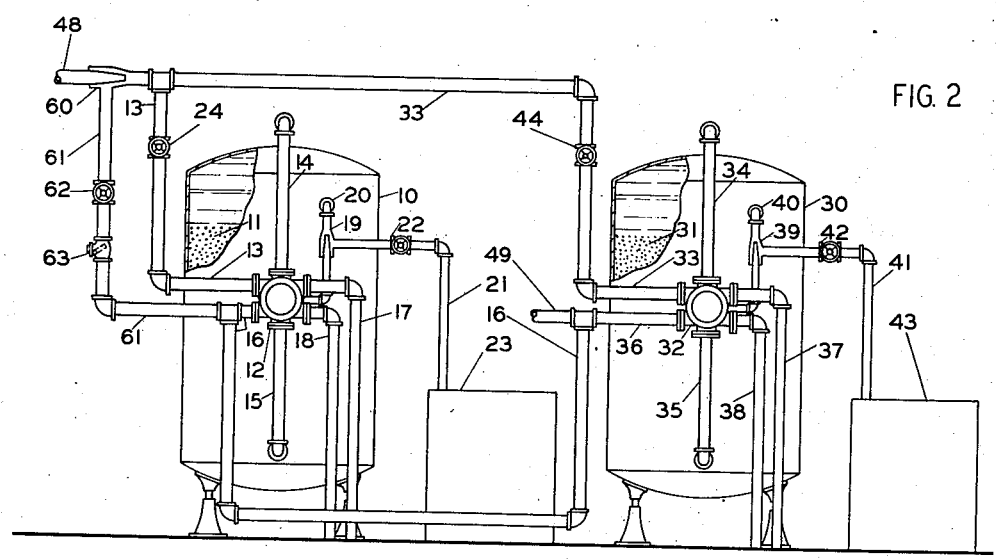

Fig. 1 is a diagrammatic view in elevation, partly in cross-section, of an apparatus in accordance with my invention and adapted to carry out the method of treating water in accordance with my invention; and Fig. 2 is a modification of the apparatus shown in Fig. 1.

Similar reference numerals refer to similar parts throughout both views.

Referring now to Fig. 1, a tank 10 contains a bed 11 of carbonaceous zeolite having hydrogen as its base, briefly termed hydrogen zeolite. A multiport valve 12, advantageously of the type described in the patent to E. Staegemann No. 2,051,155, dated Aug. 18, 1936, is provided to direct the flow through the tank. The valve 12 has a water inlet 13, a connection 14 leading to the top of the tank 10, a connection 15 leading to tank 10 below the bed 11, an outlet 16, and a pair of waste outlets 17 and 18. The valve 12 is, furthermore, connected to an injector 19 having a discharge 20 leading into tank 10 above the bed 11, and a suction connection 21 fitted with a valve 22 and leading to a tank 23 for dilute sulfuric acid. The water inlet 13 is provided with an individual valve 24.

A second tank 30 contains a bed 31 of zeolite of any desired type having sodium as its base, termed sodium zeolite, and has a multiport valve 32 of similar construction as valve 12 referred to above. Valve 32 has a water inlet 33 with an individual valve 44, a connection 34 leading to the top of tank 30, a connection 35 leading to tank 30 below the bed 31, an outlet 36, and a pair of waste outlets 37 and 38. The valve 32 is, furthermore, connected to an injector 39 having a discharge 40 leading into tank 30 above the bed 31, and a suction connection 41 fitted with a valve 42 and leading to a brine tank 43.

A supply pipe 48 for water to be treated is connected to water inlets 13 and 33, and a service pipe 49 is arranged to receive treated water from outlets 16 and 36. The apparatus described thus far is of known construction. In place of the multiport valves 12 and 33 nests of individual valves may, of course, be employed.

According to my invention I provide a branch pipe 50 leading from the outlet 16 to a pump 51 which in turn has a discharge pipe 52 fitted with a valve 53 and check valve 54 and which is connected to the supply pipe 48. The pump 51 is adapted to maintain a flow of water from pipe 16 through pipes 50 and 52 to supply pipe 48. This flow may be regulated by adjustment of valve 53.

Operation of this apparatus is as follows. A stream of water to be treated flows from the supply pipe 48 through inlet 13, valve 12, and connection 14 to the top of tank 10, passes downwardly through the bed 11 of hydrogen zeolite, and leaves the tank through connection 15, valve 12, and outlet 16. Simultaneously a second stream flows from pipe 48 through inlet 33, valve 32 and connection 34 to the top of tank 30, passes downwardly through the bed 31 of sodium zeolite, and then leaves tank 30 through connection 35, valve 32 and outlet 36. A portion of the treated water flowing through pipe 16 passes through branch pipe 50 to the pump 51 which discharges this portion through pipe 52 into the supply pipe 48. This portion of recycled treated water thus is mixed with the water to be treated before it is divided into the two streams passing through tanks 10 and 30, respectively. The remainder of the water flowing through outlet 16, together with the stream passing through outlet 36 is sent to a point of use through pipe 49.

When the zeolites in tanks 10 and 30 have become exhausted they are regenerated by operating valves 12 and 32, either manually or automatically, as described in the Staegemann patent referred to above. The zeolite is first backwashed by an upward flow of water, then brought in contact with dilute acid from tank 23 or with sodium chloride solution from tank 43, respectively, and finally rinsed free of excess acid or brine, respectively, the effluent during regeneration passing through outlets 17, 18 and 37, 38, respectively, to waste. Upon completion of the regeneration process the units are returned to service by a further movement of valves 12 and 32.

The apparatus shown in Fig. 2 is similar to the apparatus of Fig. 1 except that in place of the pump 51 with its connections 50 and 52 an injector 60 is placed in the supply pipe 48. This injector 60 has a suction pipe 61 connected through valve 62 and check valve 63 with the outlet 16. When water flows through pipe 48 a suction is produced by the injector 60 so that a portion of the treated water is re-cycled from outlet 16 through suction pipe 61 to supply pipe 48 to mix with the water flowing therethrough. At times when there is no flow through pipe 48 the check valve 63 prevents a flow of untreated water from the supply pipe 48 through suction pipe 61 to outlet 16. In all other respects the operation of the apparatus shown in Figs. 1 and 2 is alike.

In the apparatus of Fig. 2 other types of jet pumps may be used in place of the injector 60, such as a Venturi tube with the suction connection at the throat, or an orifice plate with the suction connection at the location of the vena contracta. A jet type pump is advantageous when some loss in pressure of the water to be treated is permissible because it is relatively inexpensive, requires no outside energy, and has no moving parts.

The relative quantities of water to be treated by hydrogen zeolite and by sodium zeolite are regulated by a suitable adjustment of valves 24 and 44, while the rate of flow of recycled treated water is regulated by means of valve 53 or 62, respectively, which, if desired, may be replaced by a rate of flow controller.

The effectiveness of my method of pre-treating the water is best illustrated by an example. Let it be assumed that the water to be treated is of the character shown in line A of the following table. This water has a phenolphthalein alkalinity of 40 parts per million. Such water will, in a relatively short time, attack any of the zeolites known at present (although some types are somewhat more resistant to such attack than others), thus seriously shortening the useful life of the zeolite and also causing the water to become contaminated by matter leached out of the zeolite.

*Analysis in parts per million expressed as CaCO₃*

| | | Hardness | Methyl orange alkalinity | Phenolphthalein alkalinity | Free mineral acidity | Free carbon dioxide |
|---|---|---|---|---|---|---|
| A | Water supply | 77 | 148 | 40 | 0 | 0 |
| B | Hydrogen zeolite effluent | 0 | 0 | 0 | 20 | 216 |
| C | Mixture of 100 parts A plus 31 parts B | 59 | 108 | 0 | 0 | 0 |
| D | Sodium zeolite effluent | 0 | 108 | 0 | 0 | 0 |
| E | Mixture of 73 parts B plus 27 parts D | 0 | 15 | 0 | 0 | 186 |

After this water has been passed through hydrogen zeolite it is of the character shown in line B; in place of alkalinity the water now has 20 parts per million of free mineral acidity.

If 31 parts of this hydrogen zeolite treated water are re-cycled and mixed with 100 parts of untreated water a mixture results as shown in line C. Both hardness and methyl orange alkalinity of this mixture are slightly lower than in the untreated water, and there is neither any phenolphthalein alkalinity nor, of course, free mineral acidity. Such water can safely be passed through zeolite; it will not attack the zeolite and, consequently, will not become contaminated with color as a result of any breaking down of the zeolite grains. Line D of the table shows the character of the water treated with sodium zeolite. If 27 parts of this water are mixed with the remaining 73 parts of hydrogen zeolite treated water the resultant mixture, as shown in line E, has 15 parts per million of methyl orange alkalinity, and neither hardness, nor phenolphthalein alkalinity, nor free mineral acidity. After removing from this mixture the carbon dioxide by the simple expedient of aeration it is excellently suited for most uses. A methyl orange alkalinity higher or lower than 15 is readily obtainable by changing the rate of sodium zeolite effluent to hydrogen zeolite effluent. In cases where the proportion of water to be sodium zeolite treated is small, especially when the total quantity of water to be treated is likewise small, it is sometimes more convenient to eliminate the sodium zeolite softener altogether, and to neutralize the free mineral acidity of the hydrogen zeolite treated water by feeding appropriate amounts of caustic soda. In such cases only a single stream of water passing to a hydrogen zeolite softener is pretreated by re-cycling a portion of the effluent according to my invention.

As shown by the foregoing example, my method of pretreating a water having phenolphthalein alkalinity removes this alkalinity without adding anything to the water and without in any way affecting the character of the water sent to use. It involves a minimum of equipment; and, once adjusted, the re-cycling requires no attention. The adjustment need not be exact. If somewhat more is re-cycled than is necessary for neutralization of the phenolphthalein alkalinity then there will be a further reduction in the methyl orange alkalinity of the water to be softened which is not objectionable; if, on the other hand, somewhat less is re-cycled then a small amount of phenolphthalein alkalinity will be left in the water to be passed through the zeolite, but small amounts of such alkalinity have no noticeably harmful effect.

Modifications of the apparatus illustrated and described herein may occur to others without departing from the spirit of my invention, and reference is, therefore, made to the following claims for a definition of the scope of my invention.

What I claim is:

1. A method of treating water which comprises passing a flow of water to be treated through hydrogen zeolite, then dividing the flow into two streams, and mixing one of said streams with the flow of water to be treated prior to passing said flow through hydrogen zeolite.

2. A method of treating water having phenolphthalein alkalinity which comprises passing a flow of said water through hydrogen zeolite whereby the water becomes acid, and mixing sufficient of said acid water with the alkaline water prior to passing it through hydrogen zeolite to produce a mixture having a phenolphthalein alkalinity of approximately zero.

3. A method of treating water which comprises dividing a flow of water to be treated into two streams, passing one of said streams through sodium zeolite, passing the other stream through hydrogen zeolite, then dividing said other stream into two portions, mixing one of said portions with the flow of water to be treated, and mixing the other portion with the stream passed through sodium zeolite.

4. A method of treating water having phenolphthalein alkalinity which comprises adding to a flow of said water a sufficient flow of acid water to produce a mixture having a phenolphthalein alkalinity of approximately zero, dividing the resultant mixture into two streams, passing one stream through sodium zeolite, passing the other stream through hydrogen zeolite whereby the water becomes acid, then diverting a portion of said other stream to form said flow of acid water, and combining the remainder of said other stream with the first named stream after passing the first named stream through sodium zeolite.

5. In an apparatus for treating water comprising a tank, a bed of hydrogen zeolite in said tank, a water supply pipe leading to said tank, and an outlet pipe leading from the tank to a point of use, an improvement which comprises a conduit connecting the outlet pipe with the water supply pipe, and means for establishing through said conduit a flow of water from the outlet pipe to the supply pipe.

6. The combination of claim 5, the means for establishing flow being a pump in the conduit.

7. The combination of claim 5, the means for establishing flow being a jet pump in the supply pipe.

8. In an apparatus for treating water comprising a tank, a bed of hydrogen zeolite in said tank, a second tank, a bed of sodium zeolite in the second tank, a water supply pipe connected with both said tanks, an outlet pipe leading to a point of use, a branch pipe connecting the first named tank with the outlet pipe, and a second branch pipe connecting the second tank with the outlet pipe, an improvement which comprises a conduit connecting the first named branch pipe with the supply pipe, and means for establishing through said conduit a flow of water from the first named branch pipe to the supply pipe.

RAY RILEY.